(12) United States Patent
Petterson

(10) Patent No.: US 7,913,537 B2
(45) Date of Patent: Mar. 29, 2011

(54) ADJUSTMENT DEVICE FOR A MEASURING HEAD

(75) Inventor: Bo Petterson, London (GB)

(73) Assignee: Hexagon Metrology AB, Nacka Strand (SE)

( * ) Notice: Subject to any disclaimer, the term of this patent is extended or adjusted under 35 U.S.C. 154(b) by 0 days.

(21) Appl. No.: 12/093,599

(22) PCT Filed: Nov. 15, 2006

(86) PCT No.: PCT/SE2006/050474
§ 371 (c)(1),
(2), (4) Date: May 14, 2008

(87) PCT Pub. No.: WO2007/058610
PCT Pub. Date: May 24, 2007

(65) Prior Publication Data
US 2008/0256814 A1    Oct. 23, 2008

(30) Foreign Application Priority Data
Nov. 17, 2005   (SE) .......................................  0502526

(51) Int. Cl.
*G01B 5/008*   (2006.01)
(52) U.S. Cl. .......................................... 73/1.81; 33/502

(58) Field of Classification Search ..................... 33/502, 33/503, 556; 73/1.81
See application file for complete search history.

(56) References Cited

U.S. PATENT DOCUMENTS

| | | | | | |
|---|---|---|---|---|---|
| 4,523,450 | A | * | 6/1985 | Herzog | .......................... 73/1.81 |
| 5,125,261 | A | * | 6/1992 | Powley | .......................... 73/1.81 |
| 5,154,002 | A | | 10/1992 | Ulbrich | |

FOREIGN PATENT DOCUMENTS

| | | |
|---|---|---|
| EP | 0 389 108 A2 | 9/1990 |
| JP | 59-178310 * | 10/1984 |
| WO | 02/090877 A2 | 11/2002 |
| WO | 2005/028996 A1 | 3/2005 |

* cited by examiner

*Primary Examiner* — Randy W Gibson
(74) *Attorney, Agent, or Firm* — Young & Thompson

(57) ABSTRACT

An adjustment arrangement for a measuring head, in particular an adjustment arrangement in order to simplify the calibration of a measurement probe (3) supported by a measuring head in a coordinate measuring machine, where the adjustment arrangement includes an element for the determination of the measured position of the probe ball (7), and where an element is arranged to turn or displace, or both, the probe ball in order to determine a newly measured position of the probe ball, whereby the offset of the probe ball (7) can be determined.

10 Claims, 2 Drawing Sheets

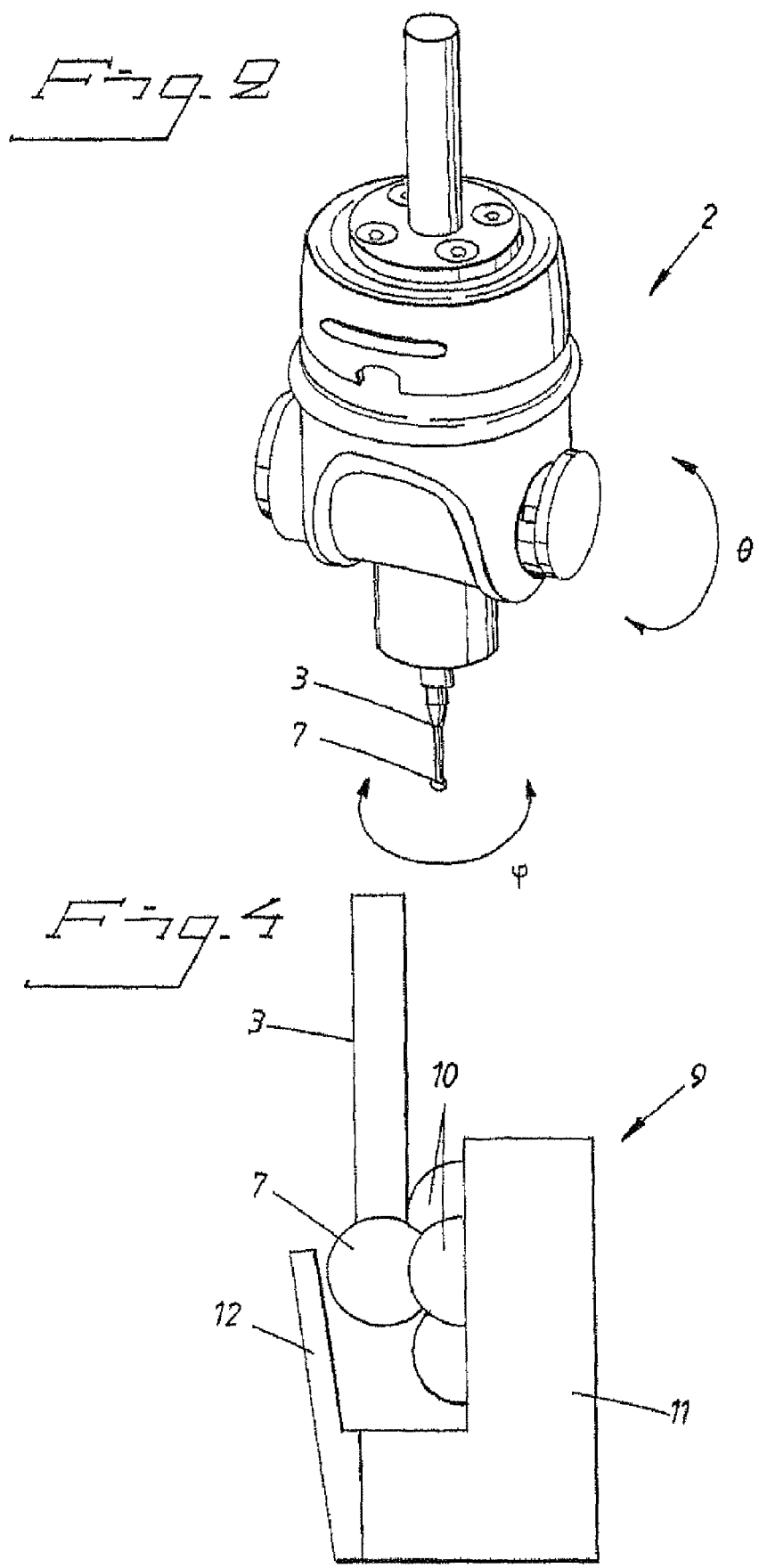

ADJUSTMENT DEVICE FOR A MEASURING HEAD

BACKGROUND OF THE INVENTION

1. Field of the Invention

Figure 1:
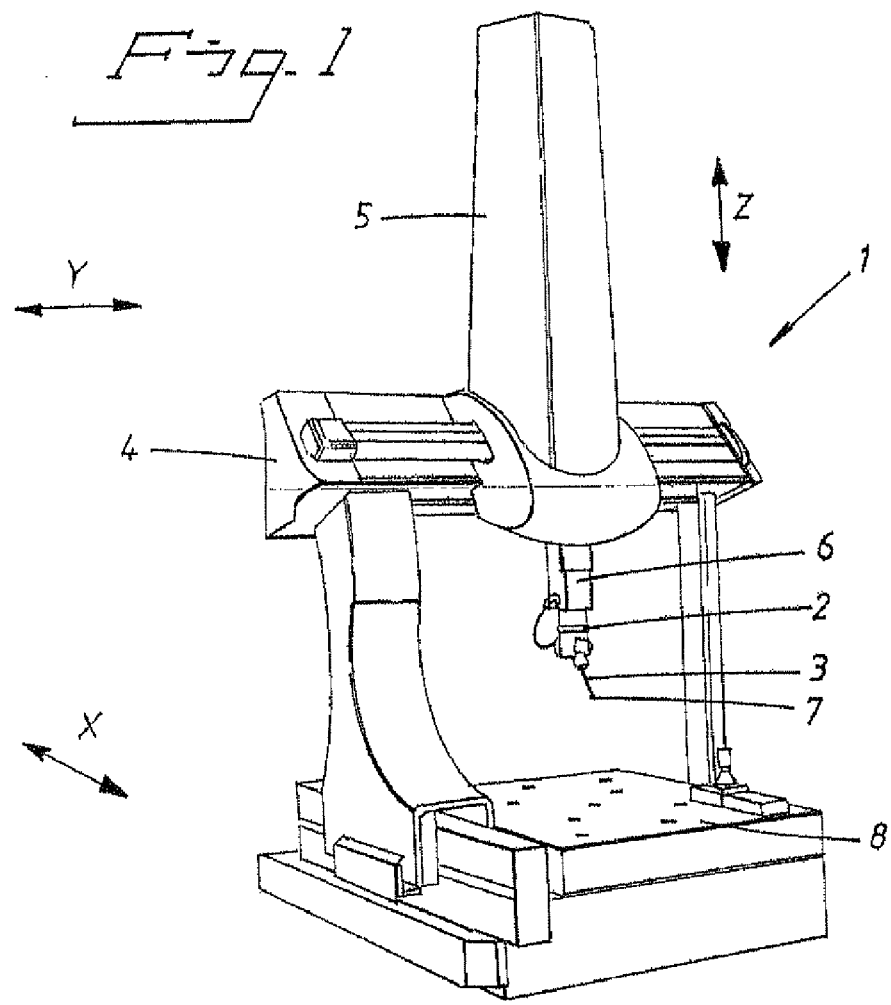

The present invention concerns an adjustment arrangement for a measuring head, in particular an adjustment arrangement for simplifying the calibration of a measurement probe supported by a measuring head.

2. Description of the Related Art

A measuring head is normally used to orient the measurement probe such that a measurement point can be taken, that is to say, determined. A normal measuring head can be rotated in two mutually perpendicular angles in such a manner that the tip of the measurement probe will travel along the outer surface of a sphere. A number of different orientations are normally used in a measurement program, and a calibration of the various positions in order to determine the diameter and offset of the probe is carried out, such that it will be possible to use the orientations with high precision.

Different types of measuring head are currently commercially available. One of these is the type known as "indexable". The measuring head can in this case be set into a number of discrete index locations with, for example, a stem of 5° between the different steps. There are two principal variants of this type, manual and automatic. The angle of the measuring head is changed manually in the manual variant, normally by means of loosening a locking screw such that the setting of the measuring head can be changed. The same procedure occurs in principle in the automatic variant, but in this case with the aid of motors built into the measuring head.

Measuring heads are also available of a type known as "continuous", in which the tip of the probe can adopt a freely chosen position on the hemisphere and the angles then are measured with the aid of angle sensors. The continuous measuring heads are automatic, i.e. they use motors to change the position. The use is, in principle, the same as that described above, i.e. the measuring heads are calibrated before use, and it is subsequently solely the reproducible precision of the measuring head itself that determines the precision.

One disadvantage of the types of measuring head described above, particularly the automatic designs with motors for turning to different angles, is that they are relatively expensive.

However, a method of using a manually indexable measuring head in an automatic manner has recently been introduced. This takes place in that the machine is used to unlock the locking screw and to carry out a change of angle. It is possible in this manner to use a manually indexable measuring head in an automatic process.

Also this latter method has, however, disadvantages such as, for example, the cost of a manually indexable measuring head is still relatively high. A second disadvantage is that the method still offers only a limited number of positions, the index steps, and a further disadvantage is that the precision depends totally on the reproducible precision of the measuring head.

SUMMARY OF THE INVENTION

It is therefore one aim of the present invention to eliminate the disadvantages of previously known adjustment arrangement for measuring heads described above and to achieve a new adjustment arrangement for measuring heads.

The aim of the invention described above is achieved with an adjustment arrangement that comprises means for determining a measured position of the probe ball, and where means are arranged in order to turn or displace, or both, the probe ball in order to determine a newly measured position of the probe ball, in which way the offset of the probe ball can be determined.

The above-mentioned determination of the offset of the probe ball is normally exactly the most critical operation during the calibration of a probe.

BRIEF DESCRIPTION OF THE DRAWING FIGURES

Figure 3:
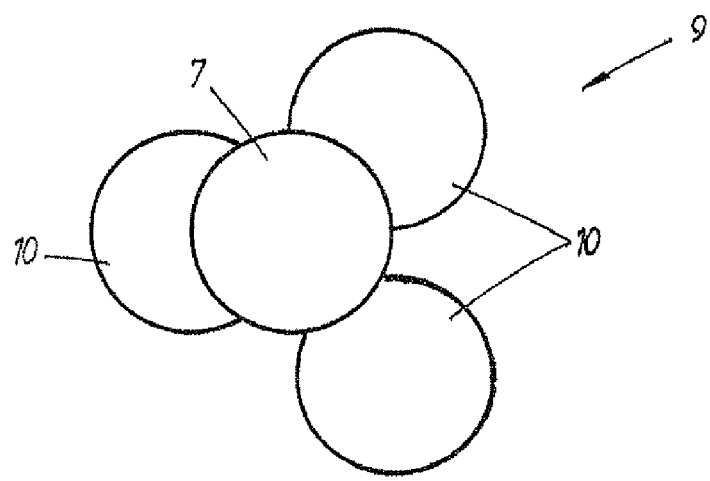

The invention will now be described in more detail in the form of a non-limiting embodiment, illustrated with the aid of the attached drawings, where FIG. 1 shows a perspective view of a coordinate measuring machine on which an adjustment arrangement according to the invention can be used, FIG. 2 shows a measuring head for a coordinate measuring machine with which an adjustment arrangement according to the invention can be used, FIG. 3 shows schematically a seating in an adjustment arrangement according to the invention with a probe ball positioned in it, and FIG. 4 shows a side view of a special arrangement of a seating in an adjustment arrangement according to the invention with a probe ball positioned in it.

DETAILED DESCRIPTION OF THE INVENTION

FIG. 1 shows, as has been mentioned above, an ordinary coordinate measuring machine 1, which comprises a measuring head 2, at the lower end of which is located a measurement probe 3. The measurement probe 3 is that part of the coordinate measuring machine 1 that is brought into contact with the object that is to be measured, and it is the part whose contact with the measurement object is recorded and forms the basis for the calculation of the coordinates of the measurement object, through the recording of the displacement and motion of the machine 1 and the measuring head 2. The coordinate measuring machine is what is known as a "portal measuring machine" in the design illustrated, comprising a portal 4 that can be displaced in the X-direction, which portal 4 supports a column 5 that can be displaced in the Y-direction and which in turn supports a rod 6 that can be displaced in the Z-direction, and onto the lower end of which is mounted the measuring head 2. The measuring head 2 can be rotated around both a vertical axis and a horizontal axis, illustrated by the angles of rotation $\phi$ and $\theta$ in FIG. 2, such that the measurement probe 3 can be turned and such that its ball 7 can be brought into contact with each point on an object placed onto the measurement table 8 of the coordinate measuring machine 1.

By arranging, according to the invention, a measured location with which the ball 7 of the measurement probe 3 can be brought into contact, it is possible to determine the offset of the measurement probe 3 in a simple manner and with high precision, which is the most important operation in order to carry out calibration of the measurement probe. This measured location can be formed, for example, as a "calibration seating" 9, where three balls are arranged in a triangular form such that the ball 7 of the measurement probe 3 always achieves a unique well-defined position when it is brought into contact with the balls 10 of the calibration seating 9, by which means the offset of the probe 3 can be determined. The calibration is then carried out by driving the coordinate measuring machine 1 such that the probe ball is located in the calibration seating 9, after which the locking of the measuring head 2 is released such that the orientation of the measuring head 2 can be changed. The locking of the measuring head 2 can be achieved with the aid of, for example, an electromagnet, such that it can easily be released by the machine. The coordinate measuring machine is then driven, while the locking of the measuring head remains unlocked, such that the measuring head achieves the orientation that is desired for the measurement that is to be carried out. Since both the position of the calibration seating and the positions of the machine axes are known, it is then possible to calculate easily the offset of the probe without the need to recalibrate the probe 3 in the new position.

In order to facilitate the placement of the probe ball 7 into the calibration seating 9 in the correct manner, the seating 9 may, as is illustrated in FIG. 4, be arranged in a holder 11 onto which the balls 10 are mounted, and where it is appropriate that also a leaf spring 12 is attached to the holder 11 and arranged such that the leaf spring 12 presses the probe ball 7 against the seating formed by the three balls 10 when the probe ball is introduced into the calibration seating 9.

It may occur during the method for adjusting the measuring head and its locking into the adjusted position described above that a change in the orientation of the measuring head takes place just from the locking procedure, which depends, of course, on the design of the locking mechanism, and this would mean that an erroneous probe offset is recorded. It is possible, however, to eliminate this problem by allowing the calibration seating to be mobile, and measuring its displacement. Such a measurement of the displacement can be carried out by, for example, mounting the calibration seating onto an attachment that is suspended using leaf springs, and measuring the displacements of these with the aid of differential transformers.

A second alternative for locking the probe is to use a friction coupling, in which it is possible to cause the probe to move by applying a force that is greater than the force of friction. This should give a cheaper solutions but one that is somewhat less reliable.

It is appropriate that an adjustment arrangement according to the invention be arranged fixed to the measurement table 8 of the coordinate measuring machine, in order to give a simple reference for the calibration of the measurement probe 3.

The invention claimed is:

1. An adjustment arrangement, the adjustment arrangement being configured to simplify calibration of a measurement probe (3) supported by a measuring head (2) in a coordinate measuring machine (1), the adjustment arrangement comprising:
   means for determining a measured position of a probe ball (7); and
   means for turning or displacing, or both, the probe ball (7) to a desired orientation with the probe ball (7) being in contact with a calibration seating (9), in order to determine a position of the probe ball in the desired orientation, whereby an offset of the probe ball (7) can be determined,
   wherein the calibration seating (9) is formed from three balls (10) arranged in a triangle, the calibration seating (9) is arranged in a holder (11) on which the balls (10) are mounted, and a leaf spring (12) is attached to the holder (11) and arranged such that the leaf spring (12) presses the probe ball (7) against the seating formed by the three balls (10) when the probe ball is introduced into the calibration seating (9).

2. The adjustment arrangement according to claim 1, wherein the coordinate measuring machine (1) comprises a portal (4) that can be displaced in a x-direction, which in turn supports a rod (6) that can be displaced in a z-direction, the measuring head (2) being mounted on a lower end of the rod (6).

3. The adjustment arrangement according to claim 2, wherein the measuring head (2) can be rotated around both a vertical axis $\phi$ and a horizontal axis $\theta$, such that the measurement probe (3) can be turned and such that the ball (7) can be brought into contact with each point on an object placed onto a measurement table (8) of the coordinate measuring machine (1).

4. The adjustment arrangement according to claim 1, wherein the measuring head (2) can be locked and released.

5. The adjustment arrangement according to claim 1, wherein the measuring head (2) can be locked and released with an electromagnet.

6. An adjustment arrangement, the adjustment arrangement being configured to simplify calibration of a measurement probe (3) supported by a measuring head (2) in a coordinate measuring machine (1), the adjustment arrangement comprising:
   a probe ball (7) configured to determine a measured position, the probe ball being adapted to turn or displace, or both, to a desired orientation with the probe ball (7) being in contact with a calibration seating (9), in order to determine a position of the probe ball in the desired orientation, whereby an offset of the probe ball (7) can be determined,
   wherein the calibration seating (9) is formed from three balls (10) arranged in a triangle, the calibration seating (9) is arranged in a holder (11) on which the balls (10) are mounted, and a leaf spring (12) is attached to the holder (11) and arranged such that the leaf spring (12) presses the probe ball (7) against the seating formed by the three balls (10) when the probe ball is introduced into the calibration seating (9).

7. The adjustment arrangement according to claim 6, wherein the coordinate measuring machine (1) comprises a portal (4) that can be displaced in a x-direction, which in turn supports a rod (6) that can be displaced in a z-direction, the measuring head (2) being mounted on a lower end of the rod (6).

8. The adjustment arrangement according to claim 7, wherein the measuring head (2) can be rotated around both a vertical axis $\phi$ and a horizontal axis $\theta$, such that the measurement probe (3) can be turned and such that the ball (7) can be brought into contact with each point on an object placed onto a measurement table (8) of the coordinate measuring machine (1).

9. The adjustment arrangement according to claim 6, wherein the measuring head (2) can be locked and released.

10. The adjustment arrangement according to claim 6, wherein the measuring head (2) can be locked and released with an electromagnet.

* * * * *